United States Patent [19]
Feuling

[11] Patent Number: 5,445,135
[45] Date of Patent: Aug. 29, 1995

[54] TWO-VALVE COMBUSTION CHAMBER SYSTEM

[76] Inventor: James J. Feuling, 2521 Palma, Ventura, Calif. 93003

[21] Appl. No.: 190,840

[22] Filed: Feb. 3, 1994

[51] Int. Cl.$^6$ .............................................. F02B 23/00
[52] U.S. Cl. ................................. 123/661; 123/193.5
[58] Field of Search ................... 123/661, 193.5, 193.6

[56]         References Cited
         U.S. PATENT DOCUMENTS

| | | | |
|---|---|---|---|
| 4,344,408 | 8/1982 | Inoue et al. | 123/661 |
| 4,453,513 | 6/1984 | Perrin et al. | 123/661 |
| 4,541,370 | 9/1985 | Sakai | 123/193.5 |
| 4,542,720 | 9/1985 | Lyndhurst | 123/193.5 |
| 4,606,308 | 8/1986 | Furlong | 123/193.5 |
| 4,686,948 | 8/1987 | Smith et al. | 123/193.5 |
| 4,686,949 | 8/1987 | Glover et al. | 123/661 |

FOREIGN PATENT DOCUMENTS

| | | | |
|---|---|---|---|
| 58-23218 | 2/1983 | Japan | 123/661 |
| 58-53630 | 3/1983 | Japan | 123/661 |
| 58-65931 | 4/1983 | Japan | 123/661 |
| 58-101216 | 6/1983 | Japan | 123/661 |
| 60-8415 | 1/1985 | Japan | 123/193.5 |

*Primary Examiner*—David A. Okonsky
*Attorney, Agent, or Firm*—Frank D. Gilliam; John R. Duncan

[57]          ABSTRACT

A combustion chamber arrangement for use with internal combustion engines having a piston in an engine block cylinder and a cylinder head secured to the block with a combustion chamber adjacent to the piston surface. One intake valve, one smaller exhaust valve and one centrally located fuel ignition device located in a cylinder head recess are provided for each engine cylinder. The two valves are preferably circular and located on opposite sides of the central ignition device, substantially on a line running through the ignition device. For best results the ratio of the diameter of the intake valve to the diameter of the exhaust valve is at least about 1:3, preferably from about 1.3 to 1.4. Substantially symmetrical squish pads are provided in the cylinder head chamber on adjacent to the row of exhaust valve, ignition device and intake valve. The piston forming the side of the combustion chamber opposite the cylinder head recess preferably has a substantially flat surface with, if desired, a shallow recess which is the mirror image of the recess between the squish pads in the head. This system provides a fast and uniform lean burn, permits use of a high compression ratio and lower octane, unleaded gasoline or other fuels and provides improved thermal efficiency.

18 Claims, 1 Drawing Sheet

TWO-VALVE COMBUSTION CHAMBER SYSTEM

BACKGROUND OF THE INVENTION

This invention relates in general to improvements in internal combustion engines and, more specifically, to an improved cylinder head and piston arrangement with an improved valve and spark plug layout for use in those engines.

A great many different intake and exhaust valve arrangements have been developed over the years for use in internal combustion engines, in particular for use in automobiles and motorcycles. Many such engines use one intake valve and one exhaust valve at each cylinder with a single spark plug. The combustion chambers are generally formed by a curved, typically hemispherical, chamber in the head and a flat piston face. A great deal of effort has gone into optimizing the sizing and placement of the valves, the shape of the combustion chamber and the like. Since there is a great need for improvements in engine fuel efficiency while maintaining or improving performance, a wide variety of different valve and spark plug configurations and arrangements have been designed and tested.

Suzuki et al. describes in U.S. Pat. No. 4,742,804 a number of combustion chamber designs using one or more intake valves, one or more exhaust valves and plural spark plugs. While quite efficient, the spark plugs and valves are offset from the chamber center and from each other in a manner which provides less than optimum combustion and the arrangement is complex and expensive to manufacture.

A number of modern high performance automobile engines use two intake valves and two or more exhaust valves with one or more spark plugs, generally arranged around the chamber periphery. Typical of these systems is that disclosed by Akana in U.S. Pat. No. 3,411,490. Manufacture and operation of four valve, multiple spark plug engines is complex and expensive and requires complex computer control for efficient operation.

Complex cylinder head arrangements, with one intake valve and one exhaust valve in the main combustion chamber adjacent to the piston and an auxiliary chamber communicating with the main chamber and having an intake valve. One or more spark plugs are provided in the auxiliary chamber and/or the main chamber. As described by Weslake in U.S. Pat. No. 2,652,039 and Von Segern et al. in U.S. Pat. No. 3,443,552, combustion may be initiated in the auxiliary chamber and spread to the main chamber where additional fuel is introduced. Again, these are complex and cumbersome systems that appear to have been unsuccessful and never have been brought into production.

Thus, while a great number of different arrangements of intake and exhaust valves and spark plugs have been designed, using a variety of combustion chamber shapes, none have provided an optimum combination of structural simplicity, maximum fuel efficiency and highest performance. Thus, despite the very extensive research and development over many years in this field and crowded nature of the internal combustion engine fuel combustion chamber art, there remains a continuing need for improvements providing greater overall efficiency at lowest cost.

It is, therefore, an object of this invention to provide an improved combustion chamber arrangement having increased operating efficiency. Another object is to provide such as system that provides both increased fuel efficiency and higher performance. A further object is to provide such a system with high thermal efficiency and low heat retention. Yet another object is to provide a system capable of operating at high compression ratios. A further object is to provide a system capable of operating with a wide variety of fuels. An additional object is to provide a system capable of easy and economical retro-fitting into existing engines.

SUMMARY OF THE INVENTION

The above-noted objects, and others, are accomplished, basically, by a combustion chamber system for internal combustion engines that is bounded by the top of a piston and a recess in the cylinder head. The piston may have an entirely flat surface or a generally flat surface having a flat-bottomed recess therein having a shape corresponding the shape of the cylinder head recess.

An ignition means, such as a spark plug or a glow plug, is located centrally in the cylinder head recess. Single exhaust and intake valves are positioned on opposite sides of the ignition means with the valve centers and ignition means lying along a straight line. The centerlines of said exhaust and intake valves may be at an angle to the cylinder centerline.

The area immediately surrounding the valves and ignition means is substantially uniformly recessed into the head, with the remainder of the area opposite the piston surface lying substantially parallel to the interface between head and piston, forming head squish pads. The head squish pads are preferably spaced from the opposed piston surface a distance, when the piston is at top dead center, no greater than equal to 0.015 times the piston diameter. A flat piston surface opposite the head squish pads thus forms the equivalent of piston squish pads. where the top of the piston is substantially uniformly recessed in a mirror image pattern of the head recess, the piston squish pads around the piston recess are correspondingly spaced from the head squish pads.

The ratio of the diameter of the intake valve to the diameter of the exhaust valve is preferably about 1.3:1, with the optimum ratio from about 1.2:1 to 1.4:1. The intake valve is preferably sized to provide a mean gas flow of from about 240 to 330 fps at the engine optimum design speed with optimum results at a flow rate of about 300 fps. The exhaust valve is preferably sized to provide a mean gas flow of from about 400 to 500 fps at the engine optimum design speed, with optimum results at a flow of about 450 fps.

This combustion chamber system has the advantage of providing lower heat absorption/retention and higher thermal efficiency. This system is capable of accommodating high compression ratios with a variety of fuels, including gasoline, diesel fuel, compressed natural gas, propane, hydrogen, ethanol, methanol and mixtures thereof.

The combustion chamber system of this invention permits the use of smaller high efficient ports and valves allowing use of the central spark plug. The combustion chamber has a low surface to volume ratio at top dead center to minimize heat transfer. The chamber is a fast burn chamber with minimum flame travel, resulting in less potential for detonation of end gases and has a lower octane requirement.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
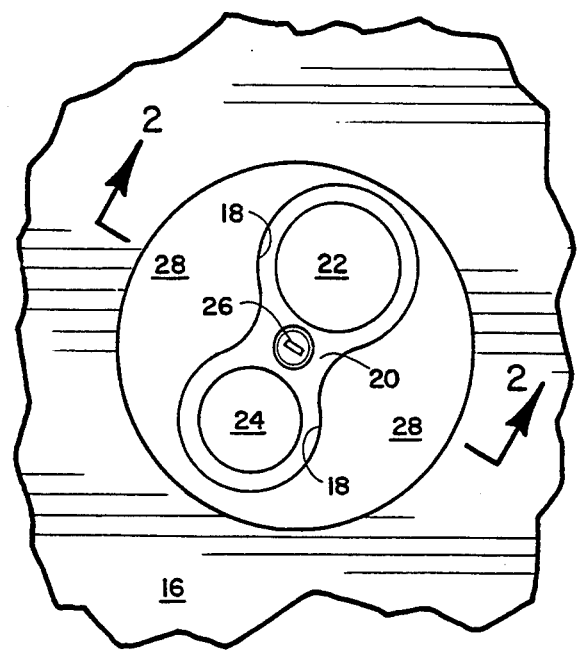
FIG. 1 is a schematic plan view of the face of a cylinder head showing a "figure-eight" shaped combustion chamber recess.
Figure 2:
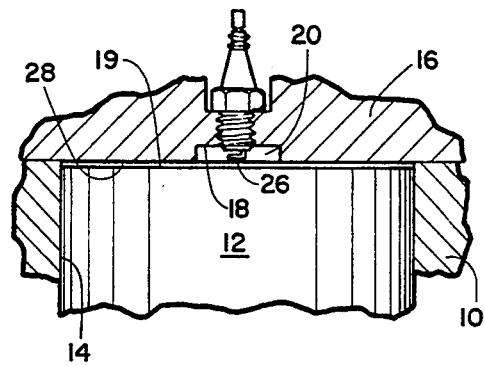
FIG. 2 is a schematic section view taken on line 2—2 in FIG. 1.

Referring to FIGS. 1 and 2, there is seen an engine block 10 of the sort used in conventional internal combustion engines. One of (generally) several pistons 12 is housed in a cylinder 14 in the block for reciprocation therealong. A cylinder head 16 is conventionally secured to the upper surface of block 10.

A recess 18 within the surface of head 16 opposite piston 12 forms the upper central portion of a combustion chamber 20 for the fuel powering the engine. Recess 18 preferably has a substantially uniform depth. In the embodiment shown in FIGS. 1 and 2, the combustion chamber is formed between the flat upper surface 19 of piston 12 and the circular chamber 20 within head 16. In this embodiment, recess 18 has a generally "figure eight" plan view. The recess surrounds, and is approximately equally spaced from, an intake valve 22, an exhaust valve 24 and an ignition means 26, typically a spark plug, glow plug, or similar means. A head squish pad area 28 surrounds recess 18.

For optimum performance, intake valve 22, exhaust valve 24 and ignition means 26 lie along a generally straight line. The ignition means 26 lies at approximately the center of combustion chamber 20. For optimum results, ignition means 26 will be substantially at the center and the two valves will be along a straight line, each spaced essentially half way between the center and the edge of combustion chamber 20. For optimum performance, the ratio of intake valve diameter to exhaust valve diameter is about 1.3:1, with ratios of from about 1.4:1 to 1.2:1 giving good results.

The opposing surfaces of head squish pads 28 and the corresponding flat surface 19 of piston 12 form a "squish" area therebetween. The areas of the flat piston surface 19 opposite head squish pads 28 form, in effect, piston squish areas. These two surfaces are preferably spaced apart at piston top dead center a distance no greater that about 0.015 times the piston diameter. For example, with a piston diameter of about 4 inches, the top dead center spacing should be no greater than about 0.06 inch, with about 0.040 inch or less preferred.

The depth and volume of recess 18 will be selected in accordance with the desired combustion ratio, piston diameter and stroke and the recess area. If desired, as described in conjunction with FIGS. 3 and 4, below, the upper surface of piston 12 may be recessed in a pattern that is a mirror image of recess 18, with a part of the combustion chamber volume then being within the piston.

As seen in FIG. 2, the centerlines of valves 22 and 24 may be at an angle to the centerline of cylinder 14. In that case, the valve seats will be recessed at a corresponding angle into recess 20.

Figure 3:
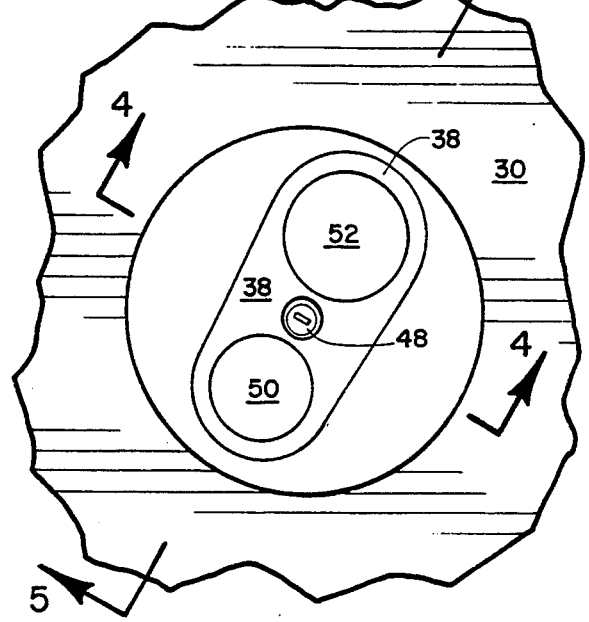
FIG. 3 is a schematic plan view of the face of a cylinder head showing a symmetrical combustion chamber recess.
Figure 4:
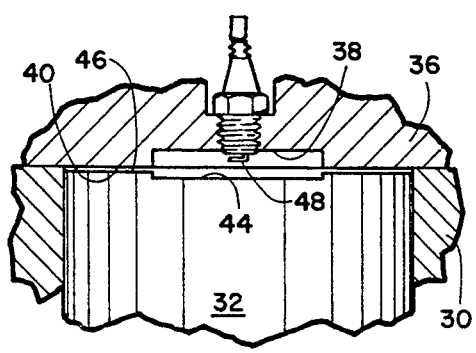
FIG. 4 is a schematic section view taken on line 4—4 in FIG. 3.

FIGS. 3 and 4 schematically illustrate another embodiment of the combustion chamber system of this invention. Here, block 30, piston 32, cylinder 34 and head 36 are generally similar to the corresponding components as seen in FIGS. 1 and 2. Recess 38, however, in this case has a generally symmetrical shape, forming two substantially identical head squish pads 48. The surface 42 of piston is generally flat over an area that corresponds to head squish pads 40, with a central recess 44 having a shape corresponding to the shape of recess 38. The flat upper surfaces 42 of piston 32 thus form cooperating piston squish pads.

If desired, an entirely flat piston surface of the sort shown in FIG. 2 may be used with the recess configuration of FIGS. 3 and 4. Ignition means 48 extends a selected distance into recess 38.

Intake valve 50 and exhaust valve 52 have the same preferred size ratios and flow rate sizing as described above in conjunction with FIGS. 1 and 2. The optimum spacing between head squish pads 40 and piston squish pads 46 is the same as described above. The depth of recesses 38 and 44 will be determined by the desired combustion ratio in accordance with piston diameter, stroke, etc. in a conventional manner.

Figure 5:
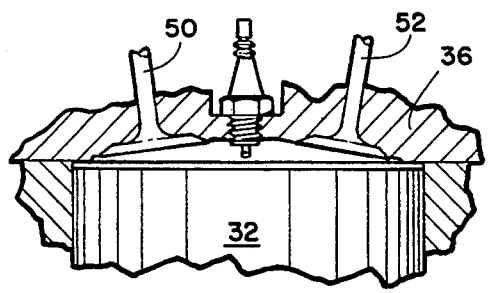
FIG. 5 is a schematic section view taken on line 5—5 in FIG. 3.

As seen in FIG. 5, valves 50 and 52 may be angled relative to the cylinder centerline. In that case, recess 38 will be domed or angled at the location of each valve 50 and 52 to accommodate the angled valve face.

While certain preferred arrangements, sizing and shapes have been described in conjunction with the above description of preferred embodiments, those may be varied, where suitable with similar results. Other variations, ramifications and applications of this invention will occur to those skilled in the art upon reading this disclosure. Those are intended to be included within the scope of this invention as defined in the appended claims.

I claim:

1. A combustion chamber system for use with internal combustion engines having at least one combination of a piston in an engine cylinder and a cooperating recessed portion of a cylinder head forming a combustion chamber therebetween, which comprises:

said piston having an overall substantially flat surface lying substantially parallel to the interface between said head and block;

a combustion chamber recess in said cylinder head adjacent to said piston;

an ignition means located substantially centrally in said recess;

an exhaust valve and an intake valve in said head on opposite sides of said ignition means and communicating with said recess;

said recess surrounding said valves and ignition means with the remainder of said head surface opposite said piston being substantially flat and forming head squish pads; and the area of said flat piston surface opposite said head squish pads forming piston squish pads spaced from said head squish pads no more than a distance equal to about 0.015 times the piston diameter when said piston is at top dead center.

2. The combustion chamber system according to claim 1 wherein said piston surface is flat across the entire surface opposite said head recess.

3. The combustion chamber system according to claim 1 wherein the central area of said overall flat piston surface has a flat-bottomed recess therein that is substantially a mirror image of said recess in said head.

4. The combustion chamber system according to claim 1 wherein said head recess is substantially symmetrical relative to a straight line passing through the centers of said valves and ignition means.

5. The combustion chamber system according to claim 1 wherein the distance between the edges of said head recess and the edges of said valves and ignition means is substantially uniform, producing a substantially "figure eight" configuration.

6. The combustion chamber system according to claim 1 wherein said intake valve is sized to provide a mean gas speed of from about 240 to 300 fps at the engine optimum design speed.

7. The combustion chamber system according to claim 1 wherein said exhaust valve is sized to provide a mean gas speed of from about 400 to 500 fps at the engine optimum design speed.

8. The combustion chamber system according to claim 1 wherein the ratio of intake valve diameter to exhaust valve diameter is about 1.4:1 to 1.2:1.

9. The combustion chamber system according to claim 1 wherein said recess has a substantially flat surface substantially parallel to the interface plane between said head and block except in the region of said exhaust and intake valves.

10. A combustion chamber system for use with internal combustion engine having at least one combination of a piston in an engine cylinder and a cylinder head with a combustion chamber therebetween, which comprises:

said piston having an overall generally flat surface lying substantially parallel to the interface between said head and block;

the combustion chamber comprising a recess in said cylinder head opposite said piston;

an ignition means located substantially centrally in said recess;

an exhaust valve and an intake valve in said head on opposite sides of said ignition means;

the centers of said exhaust and intake valves and ignition means lying along a substantially straight line;

the areas adjacent to said valves and ignition means being substantially uniformly recessed below a head flat surface which lies substantially parallel to said piston flat surface, the remainder of said head flat surface forming head squish pads;

the edges of said recess being substantially uniformly spaced from said valves and ignition means; and the area of said piston surface opposite said head squish pads and said head squish pads forming opposed piston and head squish pads.

11. The combustion chamber system according to claim 10 wherein the distance between opposed head and piston squish pads at top dead center is up to about 0.015 times the piston diameter.

12. The combustion chamber system according to claim 10 wherein said piston is flat across the entire surface opposite said head recess.

13. The combustion chamber system according to claim 10 wherein the central area of said piston surface has a flat-bottomed recess that is substantially a mirror image of the recess surrounding said valves and ignition means in said head.

14. The combustion chamber system according to claim 10 wherein said exhaust valve is sized to provide a mean gas speed of from about 400 to 500 fps at the engine optimum design speed.

15. The combustion chamber system according to claim 10 wherein said intake valve is sized to provide a mean gas speed of from about 240 to 330 fps at the engine optimum design speed.

16. The combustion chamber system according to claim 10 where the ratio of intake valve diameter to exhaust valve diameter is about 1.4:1 to 1.2:1.

17. The combustion chamber system according to claim 10 wherein said recess has an overall substantially flat surface lying substantially parallel to the interface between said head and block.

18. The combustion chamber system according to claim 17 wherein said exhaust and intake valve centerlines are at an angle to the centerline of said cylinder and the exhaust and intake valve seats are at a corresponding angle to said recess flat surface.

* * * * *